United States Patent
Boys

(10) Patent No.: US 6,895,165 B2
(45) Date of Patent: May 17, 2005

(54) APPARATUS FOR ENABLING PERPETUAL RECORDING AND INSTANT PLAYBACK OR STORAGE OF A TIME-SPECIFIC PORTION OF AN AUDIO OR AUDIO VISUAL BROADCAST MEDIUM

(75) Inventor: Mark A. Boys, Felton, CA (US)

(73) Assignee: Soundstarts, Inc., Aromas, CA (US)

( * ) Notice: Subject to any disclaimer, the term of this patent is extended or adjusted under 35 U.S.C. 154(b) by 0 days.

(21) Appl. No.: 09/143,343

(22) Filed: Aug. 28, 1998

(65) Prior Publication Data

US 2002/0071656 A1 Jun. 13, 2002

(51) Int. Cl.$^7$ ............................................... H04N 5/76
(52) U.S. Cl. ........................... 386/46; 386/125; 360/7
(58) Field of Search ............................. 386/1, 45, 46, 386/125, 126, 94; 360/5, 7, 13, 15; 369/7, 1, 6, 84, 85, 21; H04N 5/76, 9/79, 5/92

(56) References Cited

U.S. PATENT DOCUMENTS

| | | | | |
|---|---|---|---|---|
| 4,612,569 A | * | 9/1986 | Ichinose | 369/83 |
| 5,241,428 A | * | 8/1993 | Goldwasser et al. | 360/7 |
| 5,329,320 A | * | 7/1994 | Yifrach | 348/738 |
| 5,345,430 A | * | 9/1994 | Moe | 360/7 |
| 5,371,551 A | * | 12/1994 | Logan et al. | 348/571 |
| 5,438,423 A | * | 8/1995 | Lynch et al. | 386/109 |
| 5,488,409 A | * | 1/1996 | Yuen et al. | 386/83 |
| 5,633,764 A | * | 5/1997 | Ohta | 360/7 |
| 5,633,837 A | * | 5/1997 | Gantt | 369/7 |
| 5,701,383 A | * | 12/1997 | Russo et al. | 386/46 |
| 6,064,792 A | * | 5/2000 | Fox et al. | 360/7 |
| 6,072,645 A | * | 6/2000 | Sprague | 360/5 |
| 6,263,147 B1 | * | 7/2001 | Tognazzini | 386/46 |
| 6,477,312 B1 | * | 11/2002 | Houston | 386/46 |

* cited by examiner

Primary Examiner—Thai Tran
(74) Attorney, Agent, or Firm—Donald R. Boys; Central Coast Patent Agency, Inc.

(57) ABSTRACT

A radio or television apparatus has tuning circuitry for selecting a channel from an input spectrum, an output for presenting a presentation from a selected channel, a recording apparatus having a memory with capacity for recording a fixed time duration T of the selected presentation, and adapted to make an audio record sequentially in a circular fashion, such that when the memory capacity is filled, the device continues to record, overwriting the oldest recorded information, providing thereby, at any point in time, a stored copy of time duration T immediately preceding the point in time. This innovation provides limited rewind capability for real-time data streams. In alternative embodiments add-on devices are provided for existing radios and TVs.

9 Claims, 5 Drawing Sheets

APPARATUS FOR ENABLING PERPETUAL RECORDING AND INSTANT PLAYBACK OR STORAGE OF A TIME-SPECIFIC PORTION OF AN AUDIO OR AUDIO VISUAL BROADCAST MEDIUM

FIELD OF THE INVENTION

The present invention is in the area of radio and television apparatus, and pertains more particularly to methods and apparatus for recording and playing back radio and television presentations.

BACKGROUND OF THE INVENTION

Modem radios and entertainment centers typically include recording equipment. It is, for example, common for a home entertainment center to include a tape recording apparatus wherein a user may select to record portions of an incoming audio broadcast and record to tape. Similarly, such entertainment centers typically include TV receiving, tuning and display apparatus whereby one may tune to video signals, such as regular TV broadcasts. In the area of TV and other displayable video, it is common for such centers to include video cassette recording (VCR) apparatus whereby one may select to record portions of tuned video signals, so the video display may be reproduced at a later time for whatever purpose. Outside the home environment it is also common for radios, such as automobile radios, to include a magnetic tape player, allowing a user to elect to play a tape rather than a tuned-in radio presentation. Car radios, however, typically do not include recording apparatus, nor any facility for a user to record on the tape apparatus portions of the tuned radio channel that may be playing at any point in time.

Even with the existence and use of the prior art apparatus described above there is an unmet need. It often happens, for example, that a person is taken a bit by surprise by a desire to record a portion of a video or audio presentation. What usually happens is that the person watching a TV presentation or listening to a radio broadcast realizes too late that he or she would like to have a recording of all or part of what has just been presented. Of course, in some cases, the presentation may be available for purchase from the broadcaster, but this is usually not the case.

What is clearly needed is a means of automatically recording an incoming data stream in a circular manner, meaning that after a fixed time period of sequential recording, the recording apparatus will continue to record by overwriting the already recorded material in the same order as originally recorded, the oldest data being overwritten first. The net effect will be, at any moment in time, while the apparatus is recording, a recorded body of matter representing a time period prior to the present moment equal to the recorded time period represented by the magnitude of the memory apparatus being used.

In embodiments of this invention a presentation device, such as a radio or TV apparatus, will always have a recorded version of the last "x" minutes or hours of the presentation, so a user always has access to material he or she may at any moment desire to review or reproduce. The magnitude of "x" is alterable by the magnitude of the recording apparatus, and may vary from seconds to many hours in different embodiments.

SUMMARY OF THE INVENTION

In a preferred embodiment of the present invention a radio apparatus is provided comprising tuning circuitry for selecting a channel from an input rf spectrum; an output for driving a speaker system with an audio presentation derived from the selected channel; and a recording apparatus having a memory with capacity for recording a fixed time duration T of the audio presentation, and adapted to make an audio record sequentially in a circular fashion, such that when the memory capacity is filled, the device continues to record, overwriting the oldest recorded information, providing thereby, at any point in time, a stored copy of time duration T immediately preceding the point in time. In various embodiments the recording apparatus may comprise a tape recorder or a digital memory.

In preferred embodiments there are user-operable inputs for interrupting circular recording, selecting beginning positions for playback, and playing back the recorded data. OEM and Add-On devices are both taught in the descriptions below.

In an alternative aspect of the invention a television apparatus is provided comprising tuning circuitry for selecting a channel from an input video spectrum;

an output for driving a television display with a video presentation derived from the selected channel; and a recording apparatus having a memory with capacity for recording a fixed time duration T of the video presentation, and adapted to make a video record sequentially in a circular fashion, such that when the memory capacity is filled, the apparatus continues to record, overwriting the oldest recorded information, providing thereby, at any point in time, a stored copy of time duration T immediately preceding the point in time. The recording apparatus in one embodiment comprises a video tape recorder adapted to record in a circular fashion, and in another embodiment the memory is a digital memory managed to record sequentially in a circular fashion, and the video presentation is presented at the television display and simultaneously digitized as necessary and recorded in the digital memory. There are in this aspect as well, user-operable inputs for interrupting circular recording, selecting beginning positions for playback, and playing back the recorded data, and add-on devices are also provided.

In various embodiments of the invention, taught in enabling detail below, for the first time, a limited rewind capability is made available for real-time data streams.

BRIEF DESCRIPTION OF THE DRAWING FIGURES

DESCRIPTION OF PREFERRED EMBODIMENTS

Figure 1:
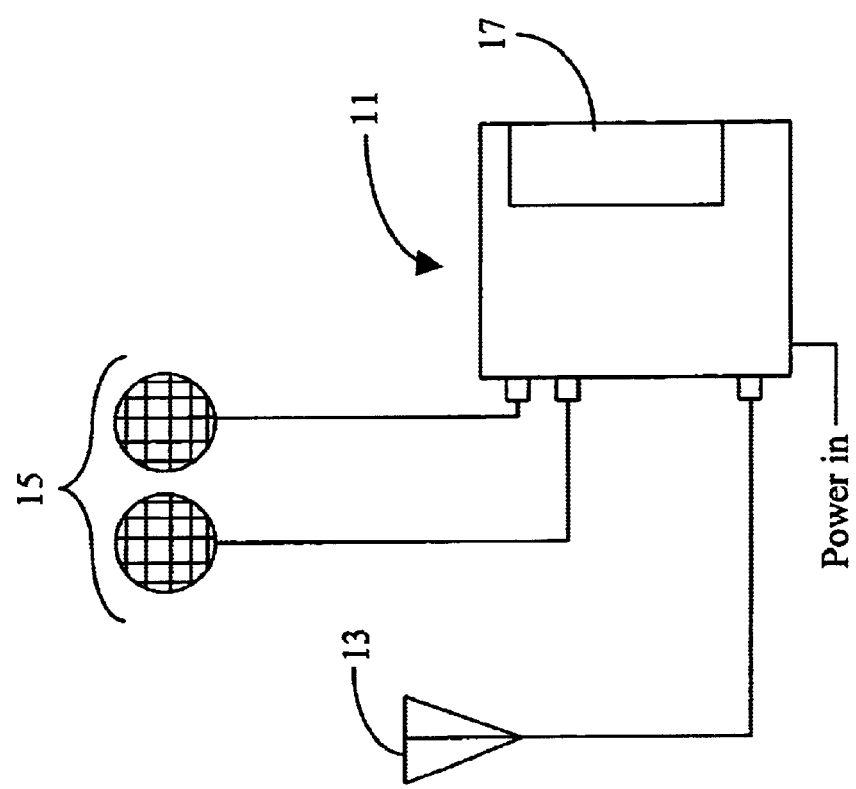
FIG. 1 is a diagram of a radio apparatus according to an embodiment of the present invention.

FIG. 1 represents a first and relatively simple embodiment of the present invention. A radio 11, such as, but not limited to a car radio, receives radio broadcasts from an antenna 13, tunes a particular channel by well-known circuitry, and plays the tuned audio presentation over a set of speakers 15, which are typically stereo speakers. Radio 11 in this embodiment also comprises a cassette tape player 17 which may conventionally be used for playing audio tapes over the same speakers 15.

In this embodiment of the invention the tape player is also capable, by selection, of recording the tuned audio played over the speakers, or other tuned audio (the radio may be capable of tuning plural channels simultaneously). Moreover, in this invention, the tape device is capable of continuous loop recording, which may be done in any one of several ways. For example, a single tape may have multiple tracks, wherein one set of tracks may be dedicated to recording in one direction, and a second set for recording in an opposite direction. There may be moveable recording and playing heads, or redundant heads properly positioned. In an endless recording mode, when the tape reaches one end, it automatically reverses and records in the opposite direction. After such a tape is filled to capacity, continuing recording will overwrite the oldest stored data, analog or digital, and, properly controlled per the insight of the present invention, create the storage medium described above as needed. If, for example, the tape can hold one hour of recording in one direction, it can hold two hours in both directions, and the tape, constantly running while the radio plays, and recording the output of the radio, will provide at any point in time a two hour repository backwards in time from the given present time.

In this embodiment the tape player may be used for playing conventional tapes, or a user may insert a blank (or a tape to be overwritten) and select a special mode by, for example, pressing a dedicated button on the radio control interface. In the special mode the tape continues to run and provide the special recording until the user has a need or desire to access the recorded data. The operation and switching from one mode to another may be managed by a dedicated processor in the device (not shown). The net effect is Rewind Radio, as the user may in effect rewind the audio presentation at any time to review or replay anything that the radio presented in the time period represented by the capacity of the recording device.

In some embodiments an input is provided for flagging. That is, a user may mark a position in the endless recording for later reference. For example, if the user recognizes a musical number or an interview or the like, playing over the speakers from the radio, that the user would like to retain, the user may, by a special input, such as a button or a voice command, cause a flag to be placed in the recording. Such a marking makes it easier for the user to later go to the position in the recorded material where the desired material is located.

In the embodiment with a single tape recording device, a user can remove the tape at any time and save it for future replay, and may simply plug a new tape into the tape recorder for continuing the circular recording process. The user may also take a tape from the device, insert it in a dual tape deck, and select a transfer desired material to a different tape.

In an alternative embodiment the radio has a second tape deck, and a user is enabled to select portions of a recorded tape and to transfer these portions to the second tape. In this embodiment a user may stop the circular recording mode, select the wanted portions, transfer those portions to the second tape, and then reenter the circular recording mode. In some situations it is not necessary to stop the tuned presentation while transfer to the second recording device is accomplished.

Figure 2:
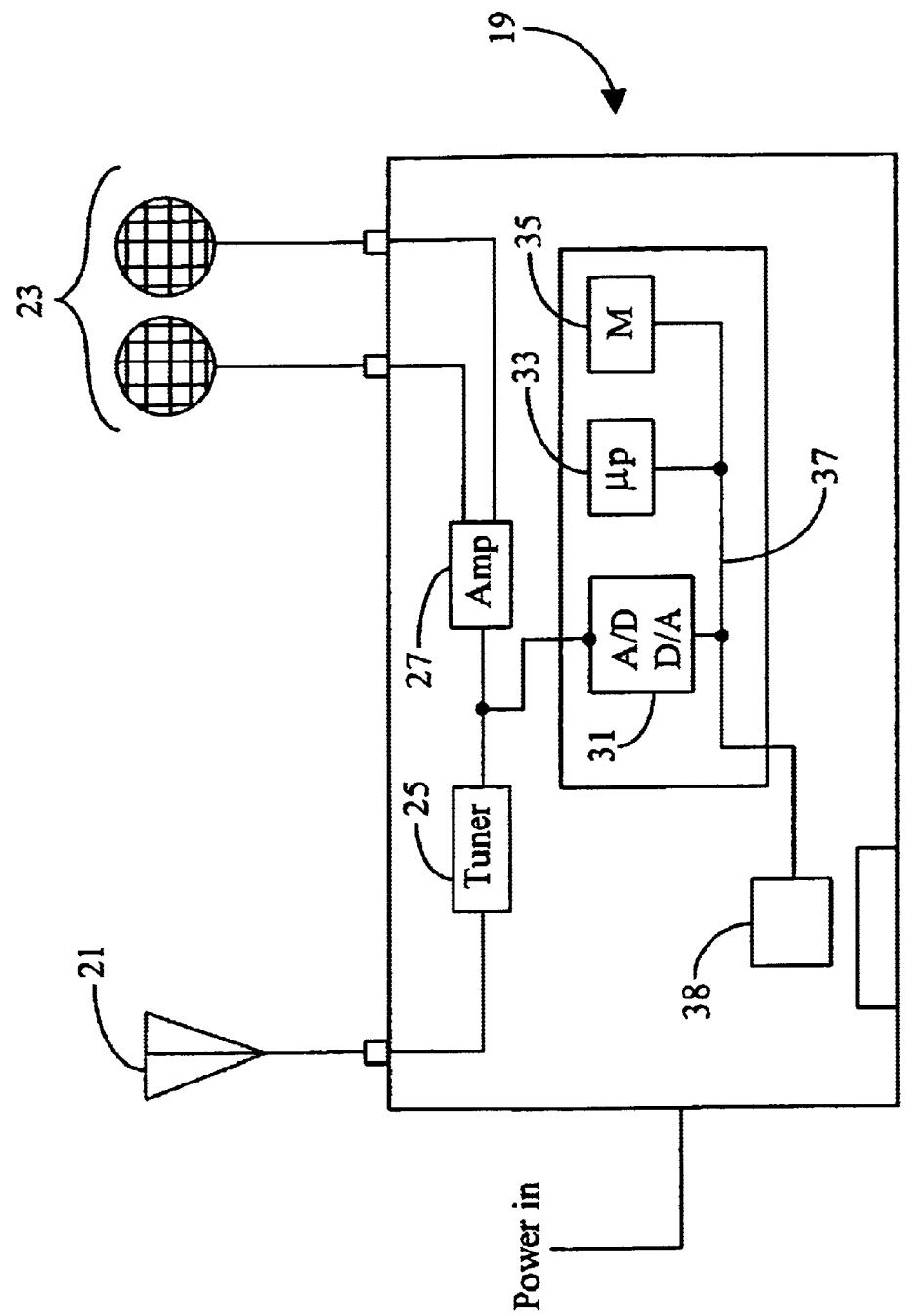
FIG. 2 is a diagram of an add-on radio recording device according to an embodiment of the present invention.

FIG. 2 represents another embodiment of the invention, wherein a radio 19 receives signals from an antenna 21, tunes a channel from the received signal by a tuner circuitry 25, amplifies the tuned signal by an amplifier 27, and plays the result over speakers 23. The conventional radio circuitry (tuner 25 and amp 27) are illustrated in a very broad manner, as such circuitry is notoriously well-known in the art.

In the embodiment illustrated in FIG. 2 a special circuitry 29 is added comprising an analog-to-digital converter (A/D) 31, a microprocessor 33 and a non-volatile digital memory 35 interconnected on a bus 37. Again, elements for such circuitry are well-known, and the apparatus is illustrated in a broad manner. The non-volatile digital memory can be any of several types available, including magnetic and optical devices. The tuned output of tuner 25 is provided to A/D 31 as shown, which puts the digital equivalent on bus 37. Microprocessor 33 manages the operation such that the digitized audio data is stored in memory unit 35.

Figure 3:
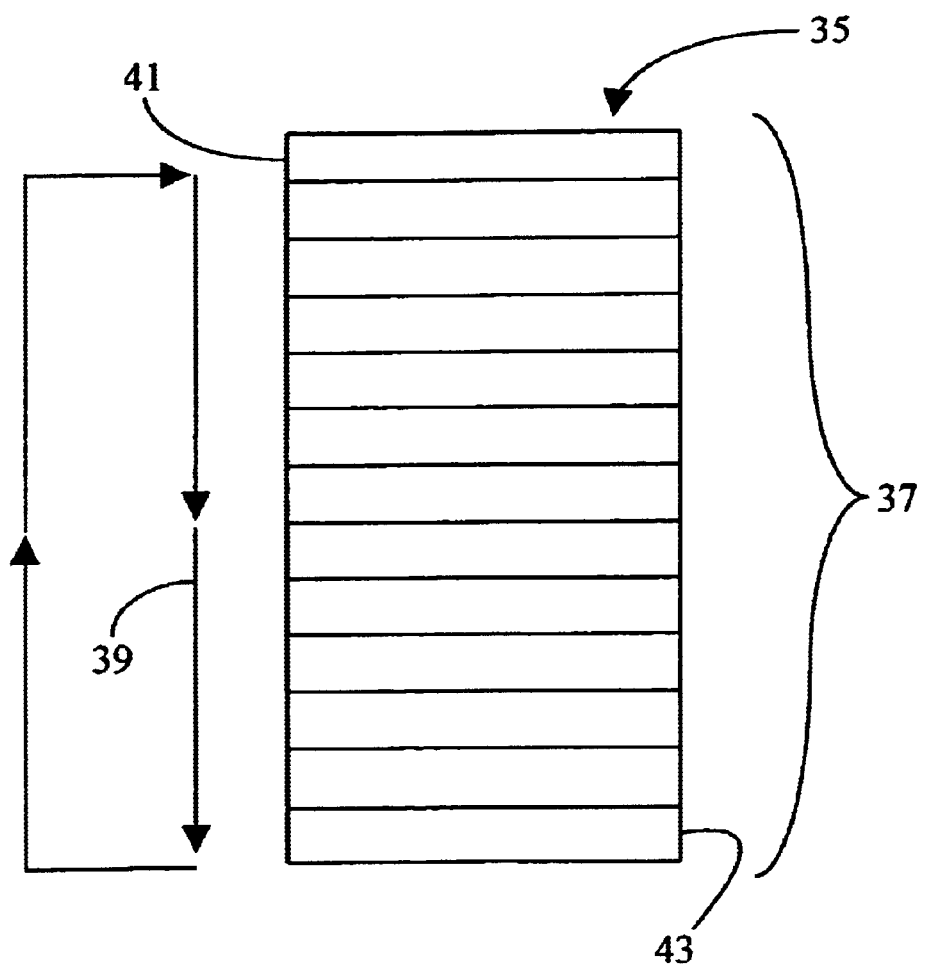
FIG. 3 is a schematic diagram of operation of a memory system according to an embodiment of the present invention.

FIG. 3 is a diagrammatic representation of memory 35, which may take any one of several forms, as described above, and is preferably what is known in the art as a Flash memory. Memory 35 is addressable word-byword, as is most digital memory, beginning with a first word at address 41 and extending to a last word at address 43. Storage of the digitized audio data is managed by microprocessor 33 to begin at word 41 (or in some cases at any other word) and to proceed always in one direction by sequential addresses in the direction of arrow set 39. It is well-known in the art that digital audio data is stored in sequentially addressed word sectors as shown.

One thing that is unique to the present invention is that the microprocessor is programmed to recognize the next word after last word 43 to be first word 41. The net result of the recording protocol, then, is a record of a fixed length of presentation up to the present time. That is, if 20minutes of audio can be recorded in memory 35, at any point in time the memory will have recorded the last twenty minutes of the tuned presentation. If at any time the user stops the recording, he/she may rewind the memory to any time in the twenty minute window, and replay and review any of the recorded material.

The result now is what the inventor terms Rewind Radio, because the operation simulates the operation of playing a prerecorded medium, wherein one may at any time rewind to replay any portion.

The length of the widow available is, of course, determined by the size of the memory and the nature of the recording, which are adjustable (at least in the design process).

In preferred embodiments radio 19 of FIG. 2 has an operator input for engaging and disengaging the Rewind mode, wherein circular recording into memory 35 takes place. In some embodiments there is another input for flagging particular points in the memory, and a flag may be inserted automatically when one intentionally disengages the Rewind mode, and at other times as may be convenient. Such flagging of addresses facilitates finding particular points in a recording for review. There are many ways this may be done. Also, there is, in preferred embodiments, a Rewind input for moving a pointer in the memory at which replay may begin. Such an input may be a jogging wheel, a spring-centered knob, or any of several other apparatus capable of performing the purpose. In a preferred operation there may be a jogging facility for moving the pointer from flag to flag in the memory.

In addition to the above-described controls, there is also a replay mode wherein selected data is read from memory, provided to converter 31, which in this case is both an A/D and a D/A converter, and played over speakers 23. When the replay mode is invoked, the normal radio function is aborted.

In another embodiment memory 35 is implemented on a removable flash memory, such as a PC card, with a docking slot, and a recording may be removed and used with another device for replay or other use.

In yet another embodiment there is a second digital memory 38, which is preferably a removable media device, such as a PC card (PCMCIA standard as known in the art), and controls are provided in the operator interface for selecting portions of material recorded in memory 35 and transferring those portions to memory 38, which may then be removed and used to transport the recorded material to another device, such as a portable or desktop PC, or a device capable of using the memory device and rendering the recorded material as audio again. This second memory device can be any kind of non-volatile removable memory, including magnetic and optical devices. In this manner a user can build a static recording of just those selections of programs he or she wishes to keep. Again, in some instances, it is not necessary to interrupt a tuned program to accomplish transfer of material from the circular to the second recording device.

In another embodiment of the present invention a Rewind TV apparatus is provided. The operation and apparatus of this device may be described with references to FIGS. 1 and 2, with the exception that the device is a TV apparatus instead of a radio, the antenna input represents input from any video data stream source, such a TV antenna or a TV cable, and the output is a TV display rather than speakers 23 shown.

The operation in the TV case is analogous to the Rewind Radio, in that the output of the tuner during operation of a Record mode is fed to both the display and the recording apparatus. In the recorder the video signal is fed to a non-volatile memory device in a circular fashion just as described for the Rewind Radio. The memory device can be a VCR (analogous to FIG. 1) or a digital memory (analogous to FIG. 2). There is an operator interface with inputs for at least starting and stopping the record mode, and initiating playback. There may also be jogging input for locating a preferred starting point in a record. In the TV case, playback may replace tuned play, or playback might be in a Pix-on-Pix window over the normal window, and so on. One may also in some embodiments tune the audio to either the tuned signal or to the playback data. In the TV case there is optionally a second memory, as described for the radio case, wherein one may transfer selected portions of material from the circular recording device to the second removable device, for the same purposes described relative to the Rewind Radio. This second device in some embodiments may be a writable CD-ROM or optical memory of another sort, as these kinds of memory have relatively high capacity. The result in this embodiment is a Rewind TV, where the last "x" minutes of any real-time presentation may be replayed.

In an alternative embodiment for TV, just the audio portion of the TV presentation may be recorded, which may be done for equal time frames with much smaller memory. In this embodiment, one may rewind and save audio selections, such as music and interviews, from video presentations.

In yet another embodiment of the invention an add-on device 45 is provided for after-market use with conventional radios. In this case radio 47 may or may not have a tape deck. Device 45 has a play-and-record tape deck 53 capable of endless recording under proper control of a microprocessor 51, as previously described with reference to FIG. 1. There is also an operator interface for at least engaging/disengaging the recording mode, and for playback, as well as a jogging input for finding a particular position in a recorded tape for playback.

For ease of installation and use in the this aftermarket embodiment, device 45 has a stereo input by which cables 49 from the radio may direct analog audio to device 45 rather than to the speakers, and device 45 also has a stereo output by which audio may be provided via cables 55 to the speakers. When device 45 is off or recording, the tuned audio signal feeds through device 45 to the speakers for real-time presentation without interruption, and when device 45 is in playback, the tuned signal is blocked, and the recorded signal is output to the speakers. Although not shown, there may additionally be various well-known elements operable in device 45, such as amplifiers and the like.

Figure 4:
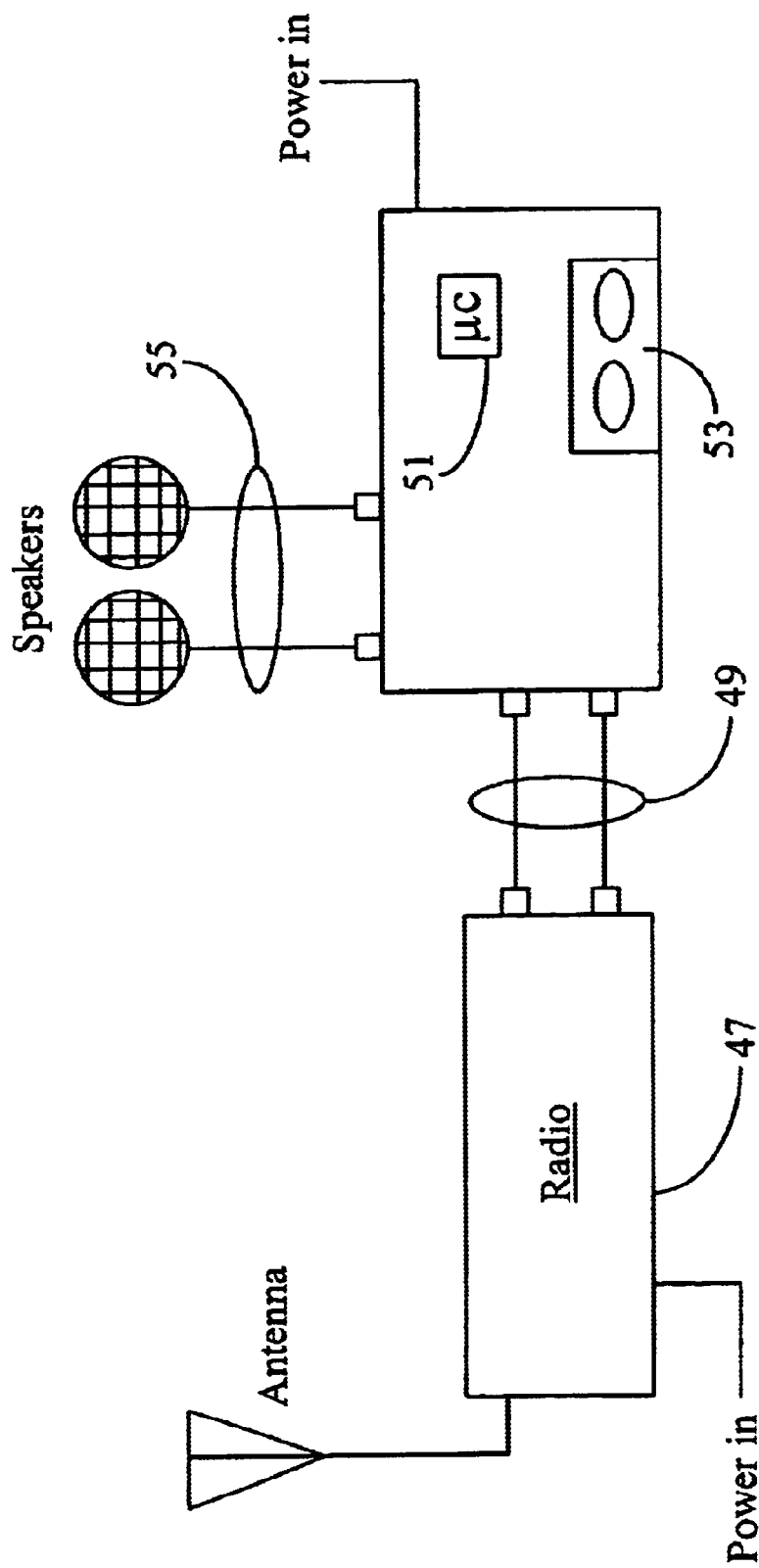
FIG. 4 is a diagram of a television device according to an embodiment of the present invention.

As described for the embodiment of FIG. 1, the add-on device of FIG. 4 may optionally have a second tape deck, and controls for such as marking portions of material for reference and transferring portions of material from one tape to the other.

Figure 5:
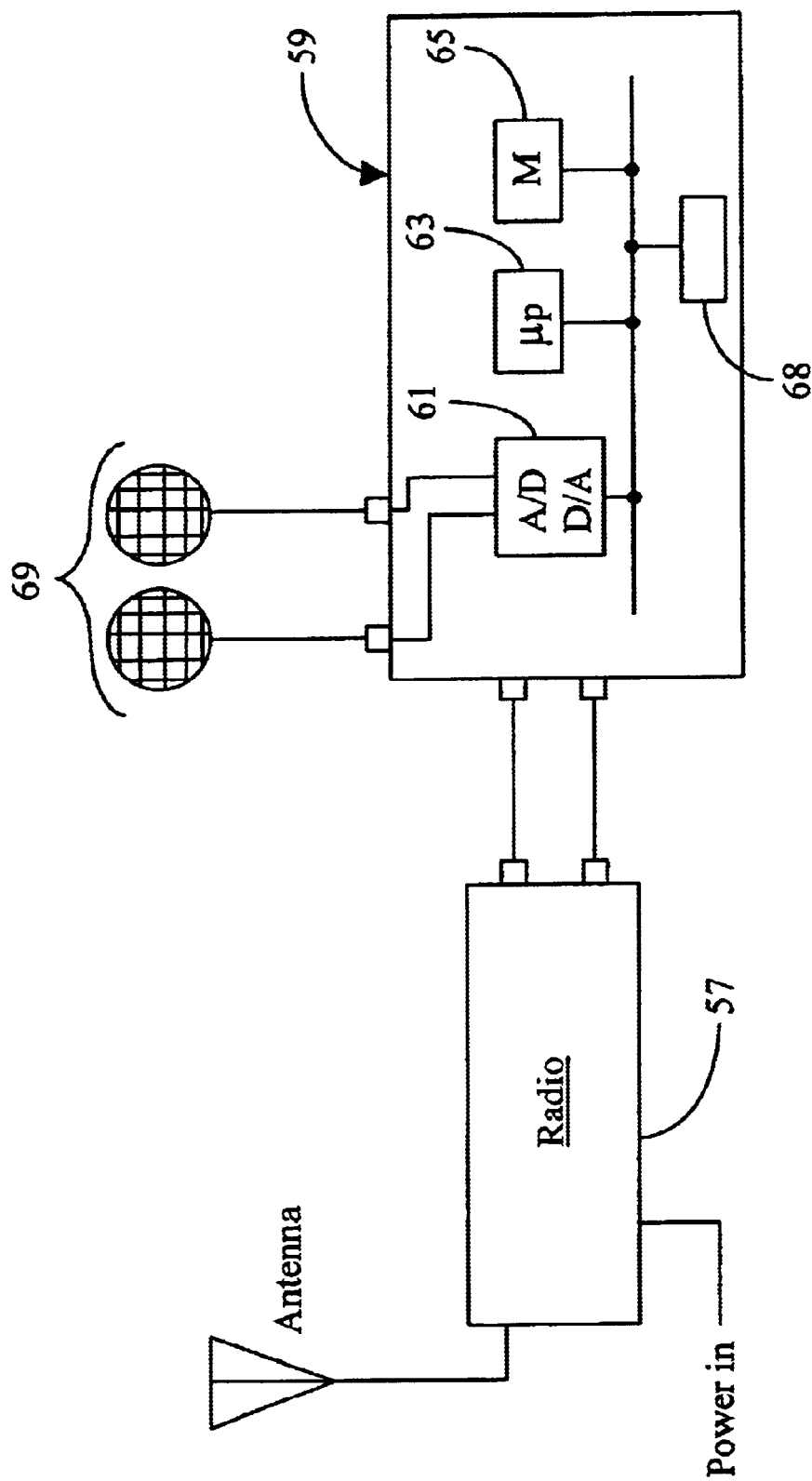
FIG. 5 is a diagram of an add-on television recorder device according to an embodiment of the present invention.

FIG. 5 is a block diagram of an aftermarket device 59 wherein recording is done digitally in the manner of radio 19 of FIG. 2. As in the device of FIG. 4 input is by cables from the speaker output of an existing radio, in this case radio 57. Converter 61 digitizes audio input, and puts the result on bus 67. Microprocessor 63 manages operations to record digital audio sequentially and circularly in memory 65 as described for memory 35 of FIG. 3. An input interface, not shown, allows for engaging and disengaging the recording and playback modes, and provides a jogging input for finding preferred places in a recording. Operation is analogous to that described for radio 19 of FIG. 2. During playback the tuned input is blocked and the recorded data is played to the speakers. There may be an amplifier and perhaps other elements, not shown, as may be necessary.

In addition, still referring to FIG. 5, there may optionally be a second digital memory 68, implemented as a removable module, such as a PC card, a hard disk, an optical memory, et al., allowing a user to transfer selected portions from circular memory 65. After such transfer the user may remove memory 68 to any other compatible device for further processing.

In yet another embodiment an aftermarket device is provided for use with existing television equipment, analogous to the radio aftermarket device of FIG. 4. In this embodiment the tape deck is a VCR device capable of endless recording, with redundant or movable heads, managed such that circular recording is accomplished as taught herein. In yet another embodiment an aftermarket device for existing TV apparatus is analogous to the apparatus illustrated with reference to FIG. 5, using a TV instead of a radio, the TV drawing a signal from any conventional source. The tuned signal is provided to the add-on device, which records the data stream digitally in a circular fashion as taught herein. In both of these add-on TV devices there may optionally be a second non-volatile memory unit, which may be any convenient sort, as described for the radio devices, allowing the user to transfer selected portions of recorded material from the circular memory to a removable memory to be taken away and processed elsewhere. Also, in either TV device, the memory operations may be for audio only, as described above.

It will be apparent to the skilled artisan that there are numerous changes that may be made in embodiments described herein without departing from the spirit and scope of the invention. For example, there are many alterations in circuitry that might be made, there are many sorts of microprocessors that might be used, and there are many ways that software and firmware may be provided, accomplishing essentially the same results. As such, the invention taught herein by specific examples is limited only by the claims below.

What is claimed is:

1. A recording device coupled with a conventional streaming audio or audio-visual media presentation device comprising:
   an input port for accepting media from the media presentation device;
   at least one recording mechanism associated with at least one data store facility having a memory with capacity for recording a specific time duration of the media presentation;
   a user interface for controlling the function of record and for enabling functions of media transfer, store, and playback of the recorded media;
   an output port for enabling throughput of the media to a speaker system and optional visual display apparatus associated with the media presentation device; and
   a user input on the user interface for inserting into the recorded media at any point and in real time during the media presentation, a first flag marking the beginning of, and a second flag marking the end of the identified media portion, the flags searchable and usable as indicia for beginning a playback session of recorded media at a desired point in the recording sequence with the playback ending at a desired point in the recording sequence, or for selecting a media portion of the recorded media for permanent storage;
   wherein the recording mechanism is adapted to make a sequential, continuous-loop recording of the media presentation, such that when the memory capacity is filled, the device continues to record, overwriting the oldest recorded information, providing at any point in time a stored copy of the specific time duration of the recorded media immediately preceding the point in time.

2. The recording device of claim 1 coupled with one of an RF radio or a television.

3. The recording device of claim 2 further comprising an analog to digital converter and wherein the at least one data store is a write able digital memory accepting data writes comprising digitally recorded media.

4. The recording device of claim 1 wherein the flag-set denotes one of a complete song, or a block of completed songs.

5. The recording device of claim 2 wherein coupling results in internalizing the device into the circuitry of the media presentation device.

6. A method for setting and initiating selective playback or permanent storage of media from a user-interface on a recording device coupled with a streaming audio or audio-visual media presentation device comprising steps of:
   (a) initiating sequential continuous-loop recording of a specific time period of the presented media;
   (b) identifying from the media presentation a specific media portion within the specific time period of the continuous-loop recording by inserting into the continuous-loop recording at any point and in real time during the media presentation, a first flag marking the beginning of, and a second flag marking the end of the identified media portion;
   (c) activating a flag-set indicia from a user interface on the recording device;
   (d) activating a recover indicia from the user interface of step (c), the recover operation for retrieving the flagged media; and
   (e) initiating playback or media store of the flagged portion of media.

7. The method of claim 6 wherein in step (a), the recording is digital.

8. The method of claim 6 wherein in step (d) the indicia is a jogging wheel manually operated to search the flag-sets.

9. The method of claim 6 wherein in step (d) the indicia is a memory button that searches for the set flags automatically.

* * * * *